(No Model.)
A. BERRENBERG.
SHIFTING PULLEY.
No. 305,417. Patented Sept. 23, 1884.
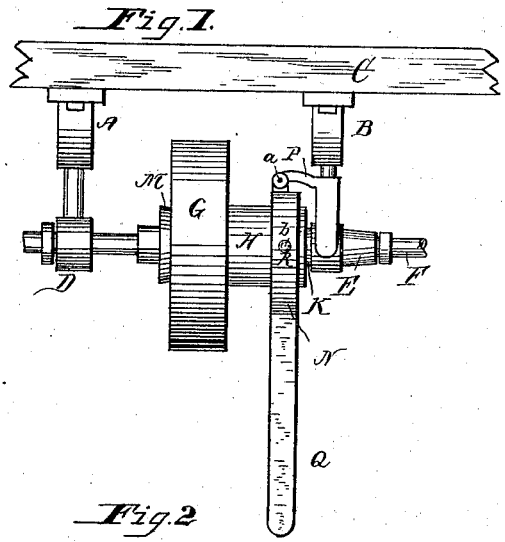
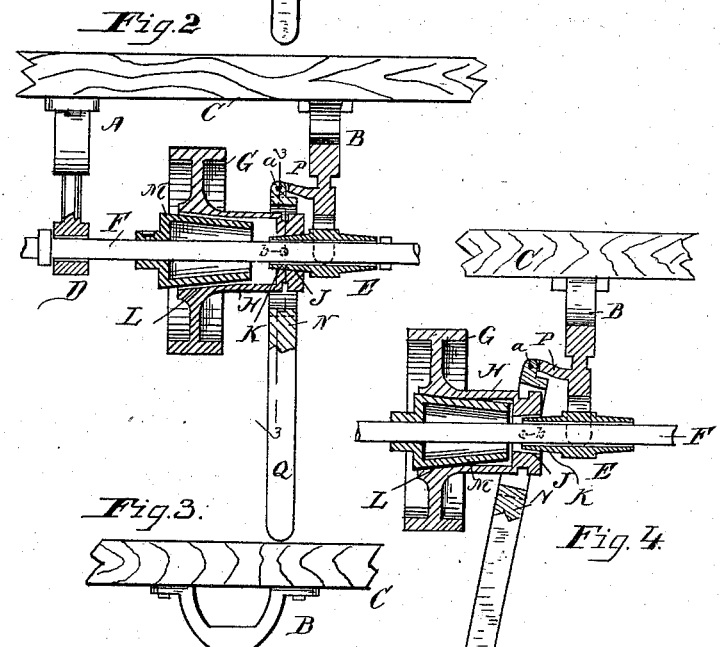
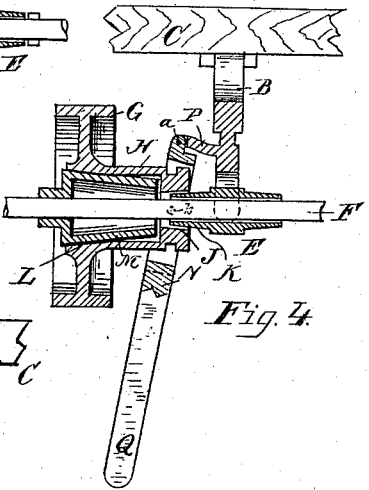
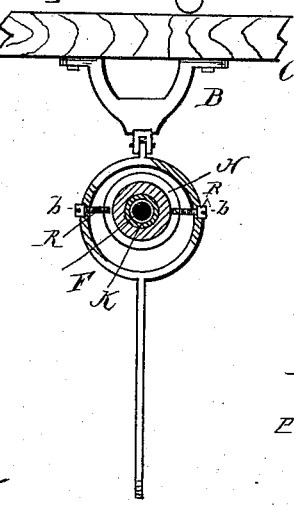
Witnesses.
Wm. T. Bellows
H. Parker Fellows
A. Berrenberg,
Inventor
per Brown Bro.
Attorneys

UNITED STATES PATENT OFFICE.

ADOLPH BERRENBERG, OF BOSTON, MASSACHUSETTS.

SHIFTING PULLEY.

SPECIFICATION forming part of Letters Patent No. 305,417, dated September 23, 1884.

Application filed January 28, 1884. (No model.)

*To all whom it may concern:*

Be it known that I, ADOLPH BERRENBERG, of Boston, in the county of Suffolk and State of Massachusetts, have invented certain new and useful Improvements in Shifting Pulleys, of which the following is a full, clear, and exact description.

This invention consists in such an arrangement of a pulley in connection with its shaft and an independent support that the pulley can be moved from such support onto and engage with its shaft, and be moved off its shaft onto its support, disengaging with its shaft, all substantially as hereinafter fully described, reference being had to the accompanying plate of drawings, in which—

Figure 1 is a side view of a pulley on its shaft, and showing this invention attached thereto; Fig. 2, a vertical longitudinal section on line of the shaft; Fig. 3, a vertical cross section; and Fig. 4, a similar vertical longitudinal section to Fig. 2, but with a change of position of the pulley, to be hereinafter described.

In the drawings, A B represent two shaft-hangers, secured to the floor C in any of the usual ways, and in the bearings D E of which is adapted to revolve the horizontal shaft F, to be driven in any suitable manner.

G is a pulley having an extended hub, H, in which is a central cone-shaped socket, J, arranged to fit the periphery of the cone-shaped extension K of the bearing E of the hanger B. The pulley G also has another central cone-shaped socket, L, on its opposite side to and in a reverse direction from its cone-shaped socket J, which socket L is adapted to fit the periphery of the cone-shape bearing M of the shaft F. The shaft being revolved in any suitable manner, if not using the pulley G, it is moved onto the cone K of the bearing E, as shown, in Figs. 1 to 3—that is, the pulley is at rest upon such cone, as shown more particularly in Fig. 2, and, being free from contact, does not turn with the shaft. When desirous of revolving the pulley, move it from its support on the cone K onto the cone M of the shaft F, by which motion will be communicated to the pulley from the shaft.

To move the pulley for the purposes described, a lever, N, pivoted at *a* to an arm, P, of the hanger B, is provided, which extends around the hub H of the pulley, and terminates in a handle, Q, below, for convenience in operating the lever. Screwing into the lever N, at *b*, are two screws, R, which project into and play loosely in a circumferential groove, S, in the hub of the pulley. Through this pin-connection R, swinging the lever N to the left moves the pulley from its support onto the shaft, and swinging it to the right moves it back onto its support.

Power can be communicated by a belt from the pulley to any other shaft, or to drive any machine, as desired.

A pulley constructed and arranged to be engaged with and disengaged from its driving-shaft, as herein described, dispenses with the loose pulley usually accompanying its driving-pulley, for when not using the shaft or the machine driven from such an arranged pulley the pulley moved onto its support on the hanger-bearing becomes stationary, the driven shaft or machine and the belt connecting them cease movement, whereby power and the wear and tear of all the parts are saved.

This invention is simple and practical in its operation, can be quickly worked, and the pulley requires no oiling.

The circumferential groove of the pulley allows it to revolve without hinderance from the screws R, and the pulley can be arranged to be moved in other ways, although as shown is simple and practical.

Having thus described my invention, what I claim is—

1. The combination, with a pulley adapted to fit a cone-shaped bearing, M, on a shaft, and a cone-shaped bearing, K, on an independent support, of means for moving said pulley from one to the other, and vice versa, substantially as and for the purpose specified.

2. The combination, with a pulley adapted to fit a cone-shaped bearing, M, on a shaft, and a cone-shaped bearing, K, on an independent support, of a pivoted lever, N, engaging with said pulley for operation substantially as and for the purpose specified.

3. The combination, with a pulley adapted to fit a cone-shaped bearing, M, on a shaft, and a cone-shaped bearing, K, on an independent support, of a pivoted lever, N, engaging by a pin, R, in a circumferential groove, S, in said pulley, substantially as and for the purpose specified.

In testimony whereof I have hereunto set my hand in the presence of two subscribing witnesses.

ADOLPH BERRENBERG.

Witnesses:
EDWIN W. BROWN,
WM. S. BELLOWS.